United States Patent [19]
Funakubo et al.

[11] Patent Number: 5,285,457
[45] Date of Patent: Feb. 8, 1994

[54] APPARATUS FOR DETECTING AN ABNORMAL BEARING CONDITION OF A BLOWER UTILIZED FOR GAS LASER EQUIPMENT

[75] Inventors: Tsutomu Funakubo, Fujiyoshida; Kenji Nakahara, Minamitsuru, both of Japan

[73] Assignee: Fanuc Ltd., Yamanashi, Japan

[21] Appl. No.: 965,402

[22] PCT Filed: Apr. 27, 1992

[86] PCT No.: PCT/JP92/00551
§ 371 Date: Dec. 18, 1992
§ 102(e) Date: Dec. 18, 1992

[87] PCT Pub. No.: WO92/20126
PCT Pub. Date: Nov. 12, 1992

[30] Foreign Application Priority Data
Apr. 26, 1991 [JP] Japan .................. 3-125151

[51] Int. Cl.$^5$ .................. H01S 3/00; H01S 3/22
[52] U.S. Cl. .................. 372/38; 372/34; 372/58; 372/59
[58] Field of Search .................. 372/38, 58, 59, 34

[56] References Cited

U.S. PATENT DOCUMENTS

| | | | |
|---|---|---|---|
| 4,907,240 | 3/1990 | Klingel .................. | 372/56 |
| 5,022,039 | 6/1991 | Karube et al. .................. | 372/58 |
| 5,060,238 | 10/1991 | Karube et al. .................. | 372/58 |
| 5,111,474 | 5/1992 | Funakubo et al. .................. | 372/58 |
| 5,124,997 | 6/1992 | Funakubo et al. .................. | 372/34 |

FOREIGN PATENT DOCUMENTS

| | | |
|---|---|---|
| 47-9446 | 5/1972 | Japan . |
| 56-81428 | 7/1981 | Japan . |
| 57-93229 | 6/1982 | Japan . |
| 60-122327 | 6/1985 | Japan . |
| 61-10689 | 3/1986 | Japan . |
| 61-295603 | 12/1986 | Japan . |

*Primary Examiner*—Georgia Y. Epps
*Attorney, Agent, or Firm*—Nikaido, Marmelstein, Murray & Oram

[57] ABSTRACT

The present invention relates to an apparatus for detecting an abnormal bearing condition of a blower utilized for gas laser equipment, and the purpose of the invention is to immediately find abnormal bearing conditions of the blower as a result of lubrication failures. The apparatus for detecting an abnormal bearing condition of a blower utilized for gas laser equipment is characterized in that it comprises a vibration sensor(2) that detects vibration of the bearing mounted at the blower(1) and outputs a vibration detected signal FIS; an amplifier(3) that amplifies the vibration detected signal FIS received from the vibration sensor(2); a comparator(4) that discriminates whether an amplified vibration detected signal FOS exceeds a determined value or not, and outputs an abnormal signal PS when it exceeds the determined value; an alarm command means(5) that outputs an alarm command signal AS when the number of the abnormal signal PS output from the comparator(4) during a determined interval exceeds a determined number; and an alarm display means(6) that displays an alarm when the alarm command signal AS is sent from the alarm command means(5).

7 Claims, 6 Drawing Sheets

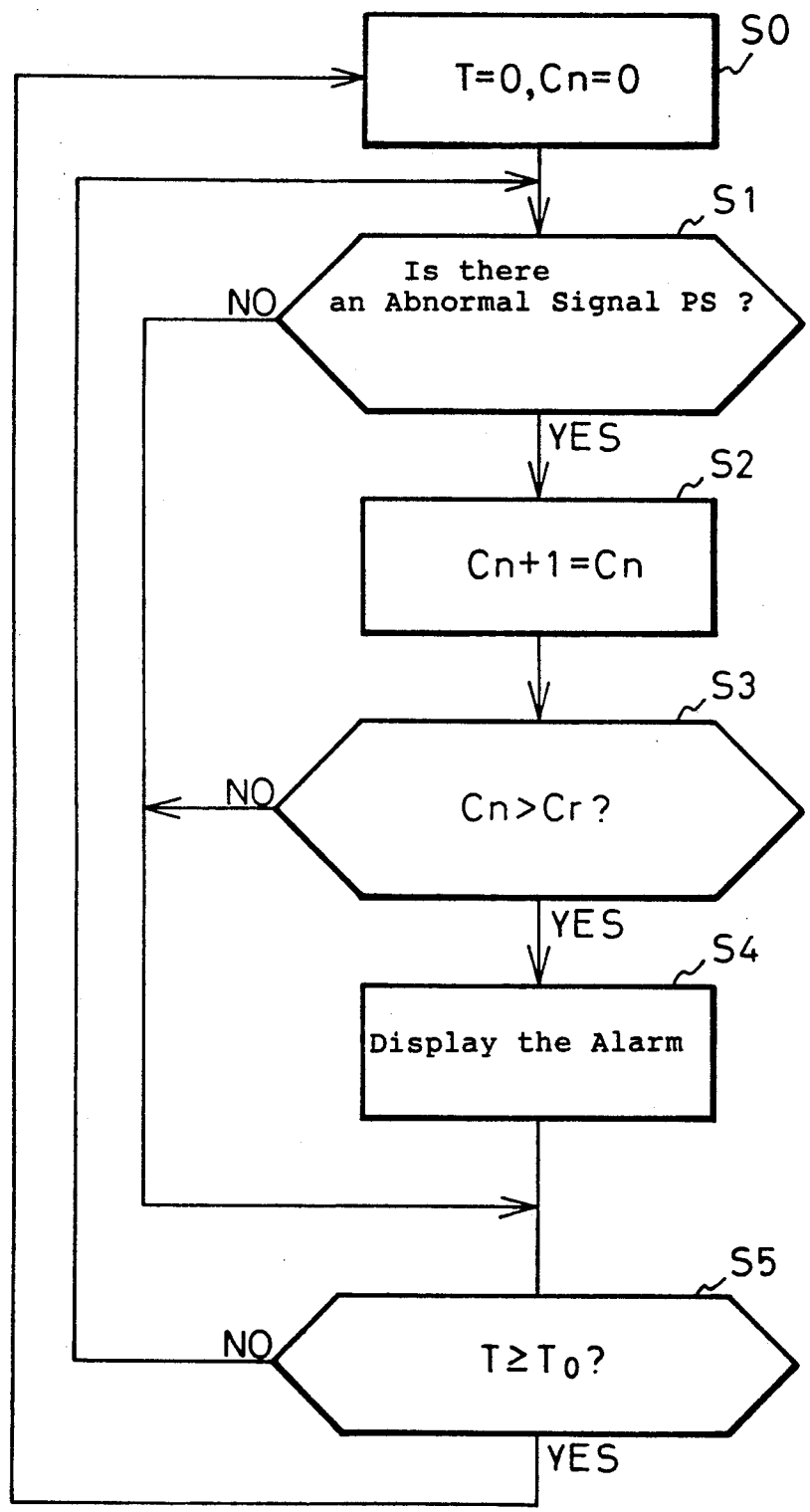

APPARATUS FOR DETECTING AN ABNORMAL BEARING CONDITION OF A BLOWER UTILIZED FOR GAS LASER EQUIPMENT

DESCRIPTION

1. TECHNICAL FIELD

The present invention relates to an apparatus for detecting an abnormal bearing condition of a blower utilized for gas laser equipment, and relates more particularly to an apparatus that detects the abnormal condition by monitoring the output values of a vibration sensor.

2. BACKGROUND ART

A gas laser oscillator for the $CO_2$ gas laser or others has been widely applied to metal machining and others as gas laser equipment connected with a numerical controller because of its high efficiency, powerful output and excellent beam characteristics. In such a gas laser oscillator, it is necessary to re-cool high temperature laser gas resulting from laser oscillation for the purpose of improving oscillation efficiency; namely, the converting electric energy to photo energy. Therefore, the laser gas is always circulated throughout the gas laser equipment via a cooler by a turbo blower and etc.

The blower for the gas laser equipment generally rotates at a high speed, such as more than 10,000 rpm, and because of this, when there is insufficient bearing lubrication, pockets (holes) of the bearing holder and outer surface thereof wears down, and both inner and outer ring surfaces facing balls or rollers also wear down, thereby increasing the bearing temperature, the load of the motor and the noise generated therefrom as a result of an increase in vibration.

Furthermore, there is the possibility of bearing seizure occurring and portions of the bearing can be damaged if operators do not notice the lack of lubrication or the lubricating oil supply is delayed.

Therefore, in the light of the above mentioned problems, it is an object of the present invention to provide an apparatus for detecting an abnormal bearing condition of a blower utilized for gas laser equipment that immediately detects the abnormal condition of the bearing as a result of a lack of lubrication or otherwise.

DISCLOSURE OF THE INVENTION

In order to solve the above mentioned problem, the apparatus for detecting an abnormal bearing condition of a blower utilized for gas laser equipment according to the present invention comprises a vibration sensor 2 that detects vibration of the bearing mounted at the blower 1 and outputs a vibration detected signal FIS; an amplifier 3 that amplifies the vibration detected signal FIS received from the vibration sensor 2; a comparator 4 that discriminates whether the amplified vibration detected signal FOS exceeds a determined value or not, and outputs an abnormal signal PS when it exceeds the determined value; an alarm command means 5 that outputs an alarm command signal AS when the number of the abnormal signal PS output from the comparator 4 during a determined interval exceeds a determined number; and an alarm display means 6 that displays an alarm when the alarm command signal AS is sent from the alarm command means 5.

The vibration sensor 2 is an acceleration type vibration sensor that detects acceleration elements of vibration or a vibration sensor that detects vibration with a particular frequency.

The vibration detected signal FIS is a peak value of the vibration of the bearing.

The fast Fourier transformer is provided between the amplifier 3 and the comparator 4, and outputs the particular frequency of vibration.

The particular frequency is 6 times as much as the rotation frequency of the blower 1.

The band pass filter is provided between the amplifier 3 and the comparator 4, and outputs the particular frequ of vibration.

BRIEF DESCRIPTION OF DRAWINGS

FIG. 5 is a flow chart of a process for the apparatus of the present invention; and, FIG. 6 shows 3 graphs, each indicating a characteristic of peak values of acceleration elements generated by vibration depending on the grease supply to the rolling bearings.

BEST MODE FOR CARRYING OUT THE INVENTION

An embodiment of the present invention will be explained hereinafter, referring to the attached drawings.

Figure 1:
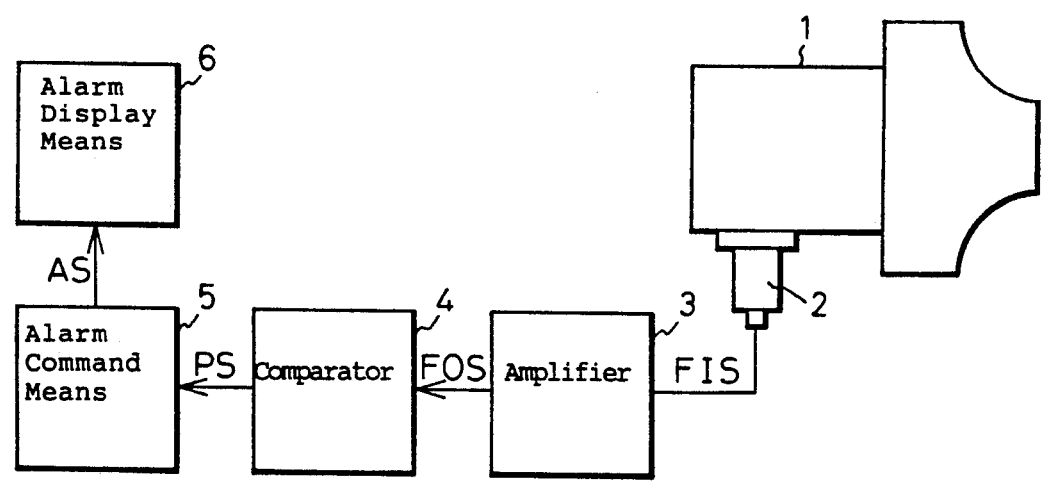
FIG. 1 is a drawing showing the principle structure of an apparatus of the present invention.

FIG. 1 is a drawing showing the principle structure of an apparatus of the present invention that detects an abnormal bearing condition of a blower utilized for gas laser equipment. In a blower 1, a vibration sensor 2 is mounted to detect the vibration of a bearing that is not shown in the drawing. The vibration sensor 2 sends a vibration detected signal FIS to an amplifier 3. A vibration detected signal FOS amplified by the amplifier 3 is sent to a comparator 4. The comparator 4 determines whether a value of the vibration detected signal FOS exceeds a determined value or not, and an abnormal signal PS is sent to an alarm command means 5 if the value of the vibration exceeds the determined value. The alarm command means 5 sends an alarm command signal AS to an alarm display means 6 if the number of abnormal signals PS sent in a determined interval exceeds a determined number; the alarm display means 6 then displays an alarm condition.

Figure 2:
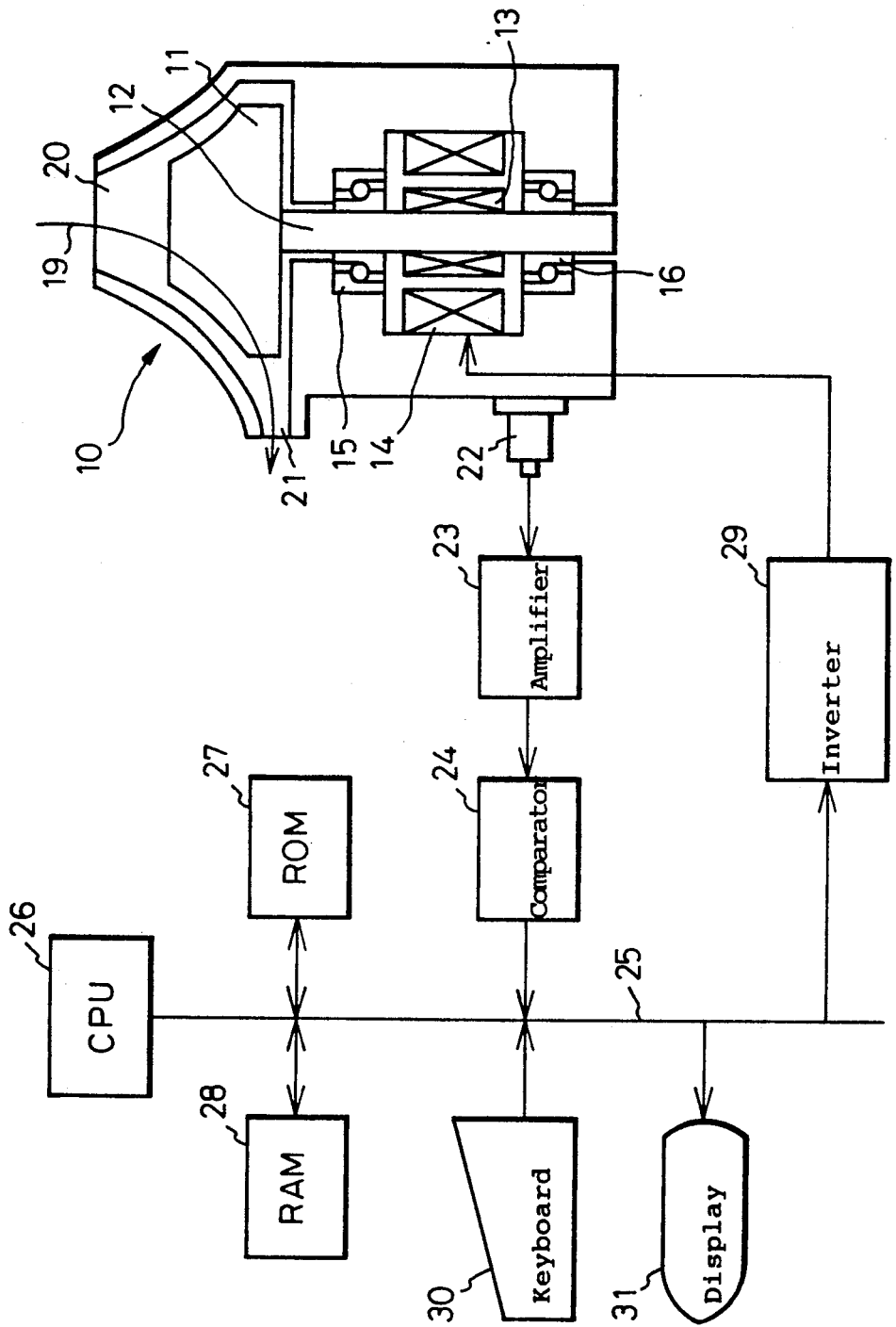
FIG. 2 is a drawing showing an embodiment of the present invention.

FIG. 2 is a drawing showing an embodiment of an apparatus of the present invention that detects an abnormal bearing condition of a blower utilized for gas laser equipment.

In this embodiment, a turbo blower 10 is used as a blower for gas laser equipment. In the turbo blower 10, an impeller 11 is mechanically connected to a shaft 12. A motor consists of a rotor 13 and a stator 14, the shaft 12 of which is fixed with the rotor 13. The impeller 11 is driven by this motor at a speed from 10,000 to 100,000 rpm (normally about 75,000 rpm). Therefore, the volume is small in inverse proportion to the speed of the motor if it is compared with the volume of a low speed roots blower.

Rolling bearings 15 and 16 are used for supporting the shaft 12, and there are several types of rolling bearing lubrication, such as oil jet type lubrication or oil air type lubrication, both of which supply oil to the bearing periodically, or grease supply type lubrication that refills grease periodically. The oil jet type lubrication is such that it blows a large amount of oil through the bearing by compressed air at positions between an inner ring and a rolling bearing holder of the bearing from a plurality of nozzles that are located normal to the bearing surface, and cool the bearing, while the oil air type lubrication is such that it supplies a continual oil stream along an inner wall of a pipe, which is obtained by feeding a small amount of oil at every determined interval by a constant amount piston type distributor to a compressed air stream in the pipe toward the bearing. In this embodiment, grease supply type lubrication is used to provide grease to the rolling bearings 15 and 16.

The turbo blower 10 draws laser gas 19 from an inlet 20 and blows it through an outlet 21 toward a cooler and a discharge tube that are not shown in the drawing.

In the outside of the turbo blower 10, a vibration sensor 22 is mounted to detect vibration generated from the rolling bearings 15 and 16 when the impeller 11 is running. In this embodiment, a piezoelectric acceleration type vibration sensor is used as the vibration sensor 22, which detects a peak value of acceleration elements of vibration. This piezoelectric acceleration type vibration sensor is named after a piezoelectric vibration sensor because a converter utilizing the phenomenon that voltage is generated when mechanical strains are applied to crystals of a crystal, or Rochele salt or etc., is called the piezoelectric vibration sensor and the converter is particularly used for the measurement of vibration acceleration. This acceleration type vibration sensor can detect vibration with higher frequencies (more than 10 kHz) compared with other types of vibration sensors, such as a position type sensor or a velocity type sensor. The vibration sensor 22, used only detects vibration with a particular frequency. In this embodiment, the sensor that detects the vibration with the particular frequency with 7.5 kHz is used, which is determined based on experimental results and a frequency 6 times as much as the running frequency of the shaft 12 can be detected most accurately when the bearing is in an abnormal condition; i.e. the shaft 12 of the turbo blower 10 is running at a speed of about 75,000 rpm and the rotation frequency in this case, is 1,250 Hz. Therefore, 6 times 1,250 Hz; namely 7.5 kHz is the setting frequency for the vibration sensor 22.

Figure 3:
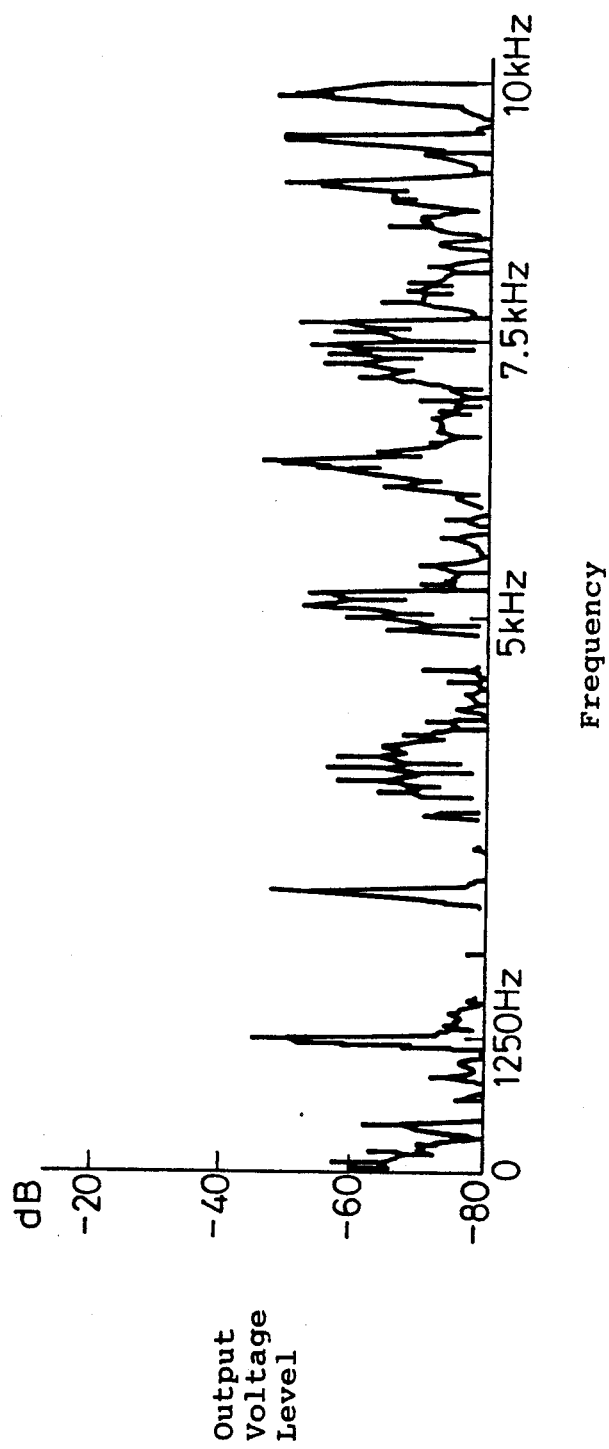
FIG. 3 is a graph showing a normal bearing condition of a blower shortly after running the blower following a grease supply to the rolling bearings thereof.
Figure 4:
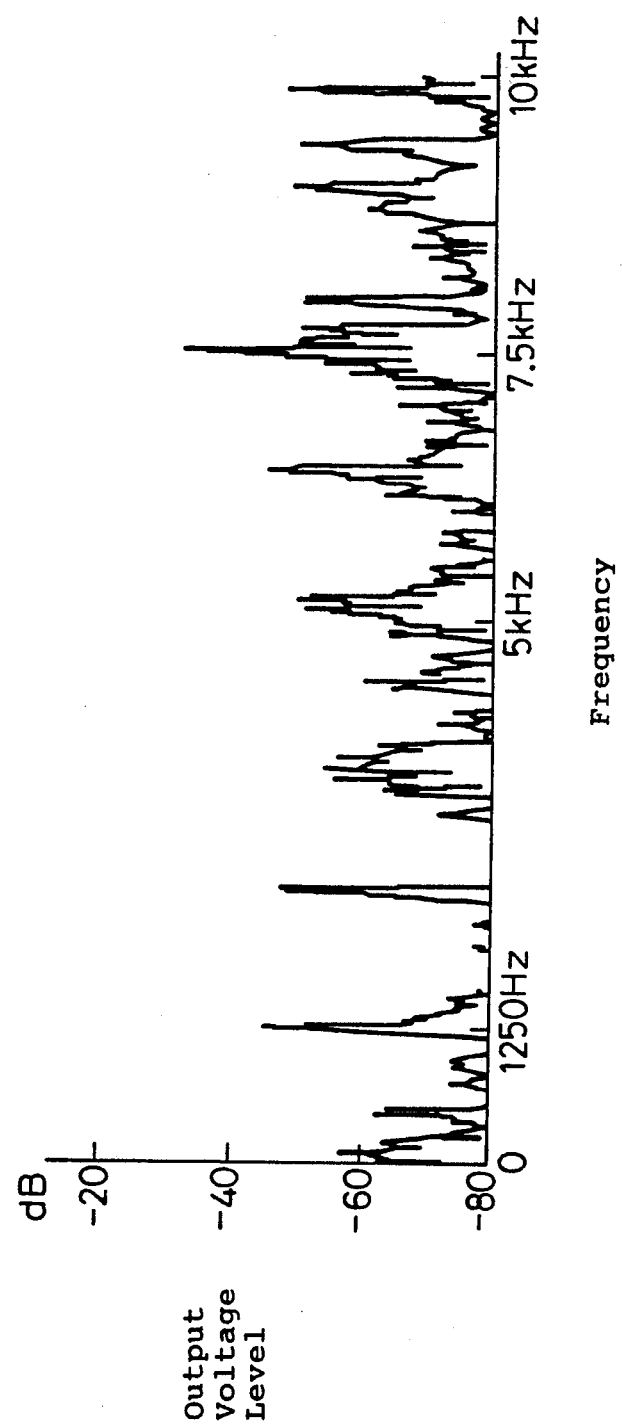
FIG. 4 is a graph showing an abnormal bearing condition of a blower long after running the blower following a grease supply to the rolling bearings thereof.

FIG. 3 and FIG. 4 show the results of the above mentioned experiment. FIG. 3 is a graph showing a normal bearing condition of a blower shortly after running the blower, following a grease supply to the rolling bearings 15 and 16 thereof. In the normal condition, when compared with output voltage levels in a frequency indicating comparatively high voltage levels of output from a vibration instrument (for example, 1,250 Hz, 2.5 kHz, 7.5 kHz, etc.), there are not apparent differences between each peak voltage level.

Whereas, FIG. 4 is a graph showing an abnormal bearing condition of a blower long after running the blower, following a grease supply to the rolling bearings 15 and 16 thereof. As can be seen by the drawing, the voltage level around the frequency 7.5 kHz, that is, 6 times as much as 1,250 Hz, is the highest. Therefore, it is understood that the setting frequency value for the vibration sensor 22 is suitably set at a frequency 6 times as much as the rotation frequency of the shaft 12.

Now, returning to the explanation of FIG. 2, the vibration sensor 22 sends the peak value of the acceleration elements of a detected vibration to an amplifier 23 as a vibration detected signal FIS, and the amplifier 23 includes an A/D converter that converts the vibration detected signal FIS from an analog signal to a digital signal, and obtains a vibration detected signal FOS, and sends the signal FOS to a comparator 24. The comparator 24 discriminates whether the peak value of the vibration detected signal FOS exceeds a determined value Px (8G) or not, and if so, it outputs an abnormal signal PS. The abnormal signal PS is sent to a processor 26 in a Numerical Controller (N.C.) via a bus 25.

The processor 26 controls the general operations of the gas laser equipment in accordance with a system program stored in a ROM 27 and reads a machining program stored in a RAM 28. The rotation of the turbo blower 10 is controlled by a high frequency inverter 29, and accessing through a keyboard 30 allows operators to command some requirements to the N.C. The display 31 displays the running condition of the gas laser equipment and displays an alarm, hereinafter mentioned, when the turbo blower is abnormal.

The sequence of a process of the apparatus for detecting an abnormal bearing condition of a blower utilized for gas laser equipment according to the embodiment of the present invention will be explained hereinafter.

FIG. 5 is a flow chart of a process for the apparatus of the present invention. In the drawing, the number following the alphabet "S" indicates step number.

(S0): Reset the timer value T and the counter value C to 0 at every determined interval, (the determined interval of this embodiment is 10 minutes).

(S1): Is there an abnormal signal PS sent from the comparator 24? If so, go to step S2, if it is not so, go to step S5.

(S2): Add 1 to the counter value Cn, whereby the counter counts how many times the abnormal signals PS are sent.

(S3): Compare the counter value Cn with a determined value Cr (for example 3), if Cn exceeds Cr, go to step S4, if Cn does not exceed Cr, go to step S5.

(S4): Send the alarm command signal AS to the display 31, and display an alarm on the display 31.

(S5): Compare the timer value T with a determined value T0, if T exceeds T0, go back to step S0, if T does not exceed T0, go back to step S1.

In this way, by monitoring the peak value of the acceleration elements of vibration detected by the vibration sensor 22 and also monitoring the frequency of the abnormal peak values, abnormal conditions can be found before damaging the bearing as a result of an increase in the temperature of the rolling bearings 15 and 16 owing to a lubrication failure. When an abnormal condition is found and displayed, it is necessary for operators to lubricate the bearing immediately, and in this embodiment, it is necessary for operators to refill the grease. The turbo blower 10 then returns to normal running conditions.

Figure 6A:
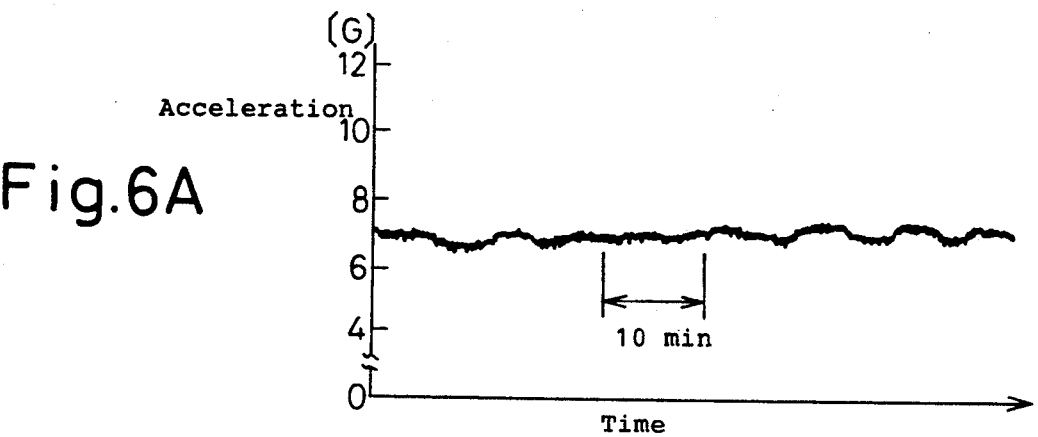
FIG. 6(A) is a graph indicating the characteristics after running a blower for about 690 hours, following a grease supply.
Figure 6B:
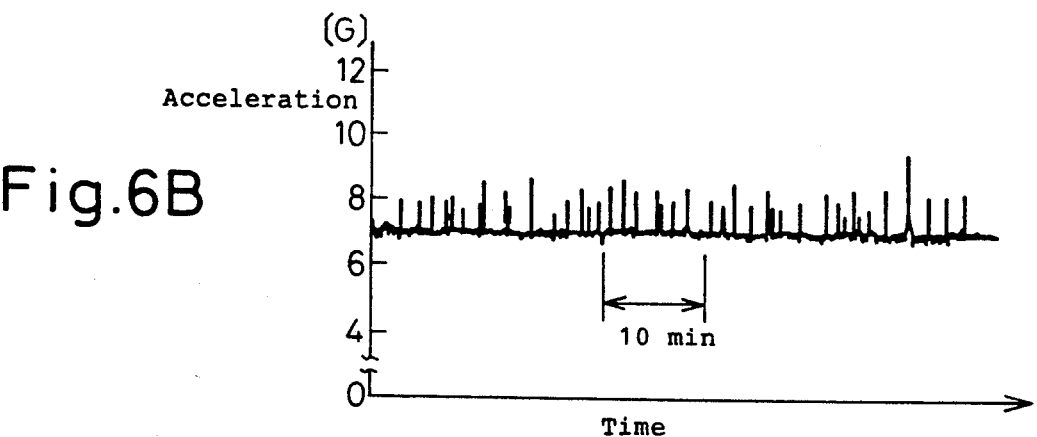
FIG. 6(B) is a graph indicating the characteristics after running a blower for about 1420 hours, following a grease supply.
Figure 6C:
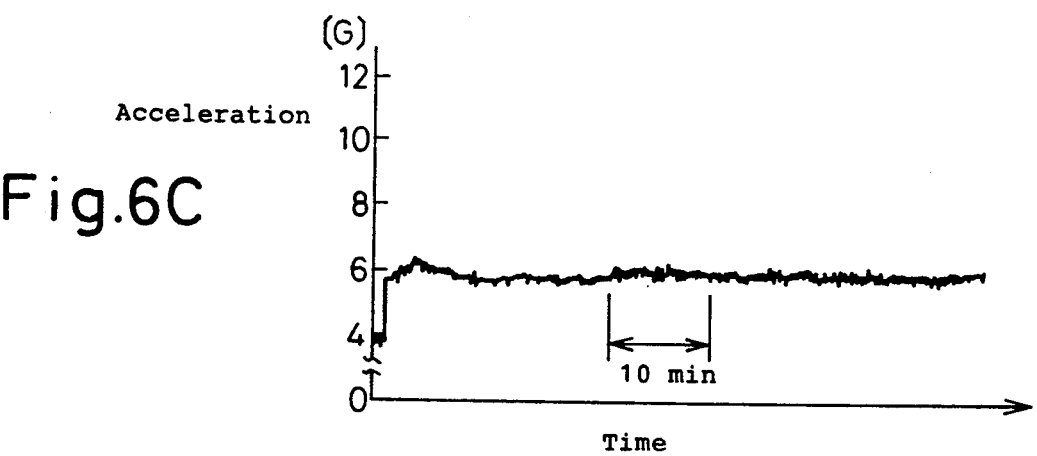
FIG. 6(C) is a graph indicating the characteristics shortly after running a blower, following a grease supply.

FIG. 6 shows 3 graphs, each indicating a characteristic of peak values of the acceleration elements generated by vibration depending on grease supply to the rolling bearings 15 and 16. FIG. 6(A) is a graph indicating the characteristics after running a blower for about 690 hours, following a grease supply, FIG. 6(B) is a graph indicating the characteristics after running a blower for about 1420 hours, following a grease supply, FIG. 6(C) is a graph indicating the characteristics shortly after running a blower, following a grease supply. In FIG. 6(A), it is observed that 0acceleration values are about 7 G, which means the values are generally stable even though there are some waves. However, in FIG. 6(B), it is observed that acceleration peak values oscillated significantly which means abnormal vibration is occurring as a result of lubrication failure because of old grease in the bearing, and pockets of the bearing holder or outer surface thereof wear down, which is more severe when unnecessary broken pieces or chips invade the bearing.

Therefore, in this case, the old grease in the bearing is removed, new grease is injected as a result of an immediate grease refill, and the condition of the bearing lubrication becomes normal at lower acceleration values of about 6 G, as can be seen in FIG. 6(C).

It should be understood that damage to the turbo blower 10 due to the lack of grease lubrication can be prevented by detecting the vibration of the bearing. In this embodiment, more accurate detection of the abnormal condition of the bearing can be obtained since it detects the acceleration element of the vibration of the bearing.

Furthermore, a detector that detects vibration with a particular frequency is used as the vibration sensor 22 in this embodiment, however a detector that detects vibration with a wide range of frequencies can also be used along with a device, located between the amplifier 23 and the comparator 24, that passes only a particular frequency range. For example, a band pass filter with a low pass filter and a high pass filter, which passes an analog signal with a particular frequency range, or a fast Fourier transformer that converts analog signals to digital signals for particular frequency range by fast Fourier transformation, can be used instead of the vibration sensor 22.

Since a frequency 6 times as much as the rotation frequency of the shaft 12 is used as a particular frequency in this embodiment, peak values of the vibration of the bearing can be accurately determined.

As explained above, according to the apparatus for detecting an abnormal bearing condition of a blower utilized for gas laser equipment, the apparatus immediately finds the abnormal condition of the lubrication of the bearing and prevents damage to the blower as a result of bearing seizure, before the temperature of the bearing increases as a result of both inner and outer ring surfaces facing the bearings wearing down as a result of lack of lubrication, and before the load of a motor and noise generated therefrom increases as a result of an increase in vibration, by displaying an alarm when the value of the vibration detected signals from the vibration sensor exceeds the determined value and the frequency of same is more than the determined number.

We claim:

1. An apparatus for detecting an abnormal bearing condition of a blower utilized for gas laser equipment is characterized in that it comprises, a vibration sensor(2) that detects the vibration of said bearing mounted at said blower(1) and outputs a vibration detected signal FIS;

an amplifier(3) amplifies said vibration detected signal FIS received from said vibration sensor(2);

a comparator(4) discriminates whether an amplified vibration detected signal FOS exceeds a determined value or not, and outputs an abnormal signal PS when it exceeds said determined value;

an alarm command means(5) outputs an alarm command signal AS when the number of said abnormal signals PS output from said comparator(4) during a determined interval exceeds a determined number; and an alarm display means(6) displays an alarm when said alarm command signal AS is sent from said alarm command means(5).

2. An apparatus for detecting an abnormal bearing condition of a blower utilized for gas laser equipment claimed in claim 1, wherein said vibration sensor(2) is an acceleration type vibration sensor that detects acceleration elements of vibration.

3. An apparatus for detecting an abnormal bearing condition of a blower utilized for gas laser equipment claimed in claim 1, wherein said vibration detected signal FIS is a peak value of said vibration of said bearing.

4. An apparatus for detecting an abnormal bearing condition of a blower utilized for gas laser equipment claimed in claim 1, wherein said vibration sensor(2) detects vibration with a particular frequency.

5. An apparatus for detecting an abnormal bearing condition of a blower utilized for gas laser equipment claimed in claim 1, wherein a fast Fourier transformer is provided between said amplifier(3) and said comparator(4), and outputs vibration with said particular frequency.

6. An apparatus for detecting an abnormal bearing condition of a blower utilized for gas laser equipment claimed in claim 4 or 5, wherein said particular frequency is 6 times as much as the rotation frequency of said blower(1).

7. An apparatus for detecting an abnormal bearing condition of a blower utilized for gas laser equipment claimed in claim 1, wherein a band pass filter is provided between said amplifier(3) and said comparator(4), and outputs vibration with said particular frequency.

* * * * *